(12) United States Patent
Kimura

(10) Patent No.: US 6,307,563 B2
(45) Date of Patent: *Oct. 23, 2001

(54) SYSTEM FOR CONTROLLING AND EDITING MOTION OF COMPUTER GRAPHICS MODEL

(75) Inventor: Shigeki Kimura, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,648

(22) Filed: Apr. 29, 1998

(30) Foreign Application Priority Data

Apr. 30, 1997 (JP) .................................................. 9-112785
Apr. 30, 1997 (JP) .................................................. 9-112786
Apr. 30, 1997 (JP) .................................................. 9-112787

(51) Int. Cl.$^7$ .................................................. G06T 13/00
(52) U.S. Cl. .................................................. 345/474; 345/157
(58) Field of Search .................................................. 345/156, 157, 345/158, 474, 473, 433, 419; 395/173, 118; 382/236

(56) References Cited

U.S. PATENT DOCUMENTS

| | | | | |
|---|---|---|---|---|
| 5,561,745 | * | 10/1996 | Jackson et al. | 345/419 |
| 5,594,856 | * | 1/1997 | Girard | 395/173 |
| 5,659,792 | * | 8/1997 | Walmsley | 395/807 |
| 5,712,964 | * | 1/1998 | Kamada et al. | 395/118 |
| 5,774,591 | * | 6/1998 | Black et al. | 382/236 |
| 5,852,450 | * | 12/1998 | Thingvold | 345/473 |
| 5,877,778 | * | 3/1999 | Dow et al. | 345/474 |
| 5,909,218 | * | 6/1999 | Naka et al. | 345/419 |
| 5,926,186 | * | 7/1999 | Itoh et al. | 345/433 |
| 5,982,389 | * | 11/1999 | Guenter et al. | 345/474 |
| 6,005,589 | * | 12/1999 | Unuma et al. | 345/473 |

* cited by examiner

Primary Examiner—Steven Saras
Assistant Examiner—Fritz Alphonse
(74) Attorney, Agent, or Firm—Pillsbury Winthrop LLP

(57) ABSTRACT

A computer graphics apparatus is constructed for presenting on a display device a motion of an object defined by a plurality of articular segments manipulatable according to state values thereof. In the computer graphics apparatus, an input device has a plurality of control units, each of which is operable for time-sequentially inputting a control amount. An assignment device provides assignment information which defines correspondence between the control units of the input device and the articular segments of the object. A function device provides a functional parameter which defines a relation between the control amount of each control unit and the state value of each articular segment when the correspondence is defined between each control unit and each articular segment according to the assignment information. The function device further operates based on the functional parameter for converting the control amount time-sequentially inputted by each control unit into a time-series of the state value of each articular segment. A graphic device graphically manipulates each articular segment according to the time-series of the state value to present the motion of the object on the display device.

39 Claims, 10 Drawing Sheets

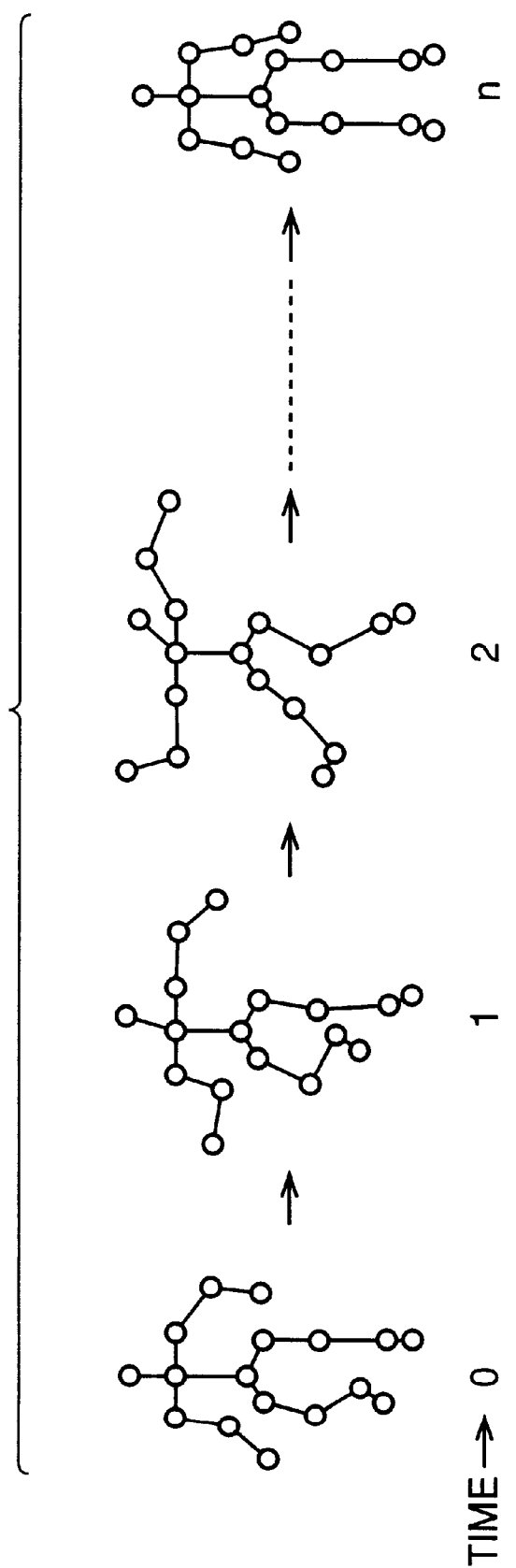

FIG.5

| TIME | NECK | | | RIGHT SHOULDER | | | LEFT SHOULDER | | | ... |
|---|---|---|---|---|---|---|---|---|---|---|
| | X | Y | Z | X | Y | Z | X | Y | Z | |
| 0 | 0 | 0 | 0 | 10 | 10 | 15 | −10 | 10 | 15 | |
| 1 | 2 | 0 | 0 | 15 | 15 | 15 | −15 | 15 | 15 | |
| 2 | 3 | 0 | 0 | 20 | 10 | 10 | −20 | 10 | 10 | |
| 3 | 2 | 0 | 0 | 15 | 10 | 10 | −15 | 10 | 10 | |
| 4 | 0 | 0 | 0 | 10 | 10 | 10 | −10 | 10 | 10 | |
| 5 | 0 | 0 | 0 | 10 | 10 | 10 | −10 | 10 | 10 | |
| 6 | 0 | 0 | 0 | 10 | 10 | 10 | −10 | 10 | 10 | |
| 7 | 2 | 0 | 0 | 10 | 10 | 15 | −10 | 10 | 15 | |
| 8 | 3 | 0 | 0 | 15 | 15 | 15 | −15 | 15 | 15 | |
| ⋮ | ⋮ | ⋮ | ⋮ | ⋮ | ⋮ | ⋮ | ⋮ | ⋮ | ⋮ | |

FIG.8

JOINT ASSIGNMENT DIALOG BOX

FILE NAME: ABC.WRL

| RECORDING ENABLED/ DISABLED | JOINT OF INPUT GLOVE | JOINT OF MODEL | MAGNIFICATION RATE X Y Z | | | OFFSET X Y Z | | |
|---|---|---|---|---|---|---|---|---|
| ✓ | THUMB 2 | LEFT SHOULDER | 5 | 6 | 7 | 2 | 3 | 4 |
| ✓ | THUMB 1 | LEFT ELBOW | 5 | 6 | 7 | 2 | 3 | 4 |
| ✓ | INDEX FINGER 3 | LEFT WRIST | 5 | 6 | 7 | 2 | 3 | 4 |
| ✓ | INDEX FINGER 2 | NECK (LOWER) | 5 | 6 | 7 | 2 | 3 | 4 |
| ... | ... | ... | | | | | | |

[OK] [CLOSE]  [STORE] [READ]

FIG.9(a)

| TRACK | RECORD ON/OFF | RECORD BUFFER → TIME   * ··· DATA |
|---|---|---|
| LEFT SHOULDER | ○ | * * * * * * * *                       ... |
| RIGHT CROTCH | ○ | * * *    * * * *    * * * * *    * *  ... |
| LEFT CROTCH | ○ | * * *       * * *      * * * * *      ... |
| RIGHT KNEE | ○ | * * *    * * * *    * * * * *    * *  ... |
| LEFT KNEE | ○ | * * *       * * *       * * * *       ... |
| NECK | × | |
| RIGHT ELBOW | × | |
| ⋮ | ⋮ | ⋮ |

RECORD

FIG.9(b)

| TRACK | RECORD ON/OFF | RECORD BUFFER → TIME   * ··· DATA |
|---|---|---|
| LEFT SHOULDER | ○ | ERASE [           ] * *              ... |
| RIGHT CROTCH | × | * * *    * * * *    * * * * *    * *  ... |
| LEFT CROTCH | × | * * *       * * *      * * * * *      ... |
| RIGHT KNEE | × | * * *    * * * *    * * * * *    * *  ... |
| LEFT KNEE | × | * * *       * * *       * * * *       ... |
| NECK | × | |
| RIGHT ELBOW | × | |
| ⋮ | ⋮ | ⋮ |

EDIT

FIG.9(c)

| TRACK | RECORD ON/OFF | RECORD BUFFER → TIME   * ··· DATA |
|---|---|---|
| LEFT SHOULDER | × |                                * *    ... |
| RIGHT CROTCH | × | * * *    * * * *    * * * * *    * *  ... |
| LEFT CROTCH | × | * * *       * * *      * * * * *      ... |
| RIGHT KNEE | × | * * *    * * * *    * * * * *    * *  ... |
| LEFT KNEE | × | * * *       * * *       * * * *       ... |
| NECK | ○ |          * * * * * * * *              ... |
| RIGHT ELBOW | ○ |             * * * * * * * *           ... |
| ⋮ | ⋮ | ⋮ |

RECORD

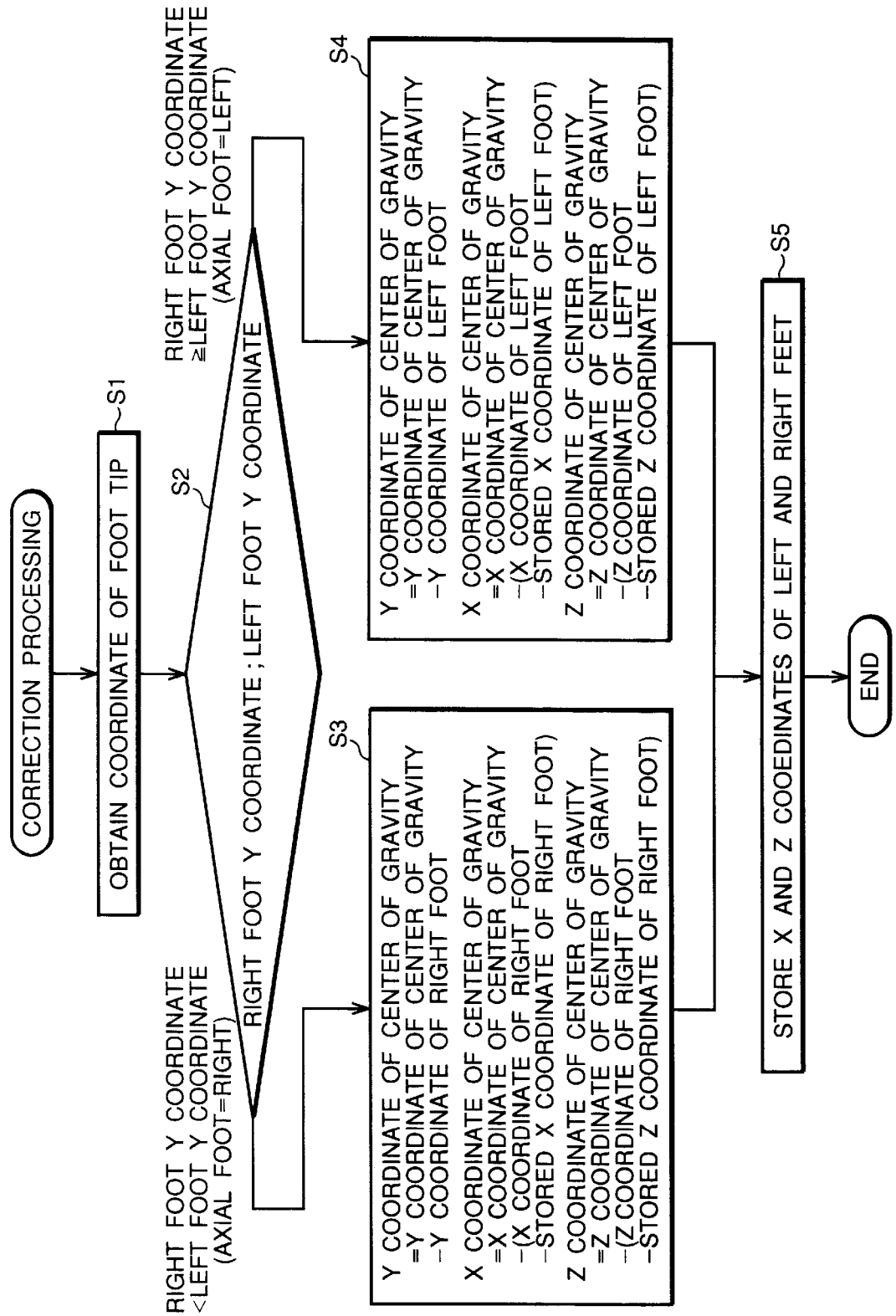

SYSTEM FOR CONTROLLING AND EDITING MOTION OF COMPUTER GRAPHICS MODEL

BACKGROUND OF THE INVENTION

1. Field of the Invention

The present invention generally relates to a graphic control system for controlling motion of a computer graphics (CG) model that has a skeleton structure generated by computer graphics and that is adapted to be operated for presenting various postures of the model.

2. Description of Related Art

In order to impart a sequence of motions to a CG model or an object having a skeleton structure of a human body or an animal body for example, it is required to specify a change in an articular angle and a positional shift of joints or articular segments of the skeleton structure. Conventionally, this specification has been performed by use of a motion capture device. This device controls a CG model based on data obtained from sensors attached to a source moving body to capture motions thereof. The method used by this device is advantageous in that a multiple of control points or joints can be handled by use of a multiple of sensors. In addition, if sensors can be arranged in configuration generally simulating an object to be displayed, appreciably realistic motions can be imparted to the object of a human body for example. However, this motion capture device has drawbacks in that the device itself is very large in scale and lots of operations are required for controlling a CG model.

In consideration of the above-mentioned drawbacks, a system has been developed in which an input glove is used for a simplified input device to edit an animation in real-time by three-dimensional CG (hereafter referred to as 3D CG). The input glove is worn by a hand of the operator to detect movements of fingers, by which a computer is controlled. For example, such a system is disclosed in "Development and Operation of a Real-time Character Animation System," Ogura, NICOGRAPH Collected Papers, 1993, pp. 131–139. In the disclosed system, control units arranged on joints of each finger of the input glove are assigned to joints or articular elements of a 3D CG object so that the motion thereof is controlled as if manipulating a puppet.

However, the above-mentioned real-time character animation system is intended to move a CG model in real-time while superimposing the same on a video taken from life. In this system, only simple operation is conducted by the input glove. The conventional input glove is not designed to handle complicated motions of CG model as with motion capture device. Therefore, CG model motions are confined to simple ones, thereby narrowing an application field. Another problem is that no consideration is taken into editing of recorded motions of CG model.

As described before, in order to impart a sequence of motions to a CG model having a skeleton structure of a human body or an animal for example, it is required to specify a change in the angle and position of joints contained in the skeleton structure. The location of the CG model is determined by three-dimensional coordinates of a parent or basic joint. Normally, the parent joint is often set to the waist or the pelvis of the CG model. Therefore, if both knees of the CG model are bent with no preparatory process performed, the CG mode floats in the air, which is an unnatural state or posture. To prevent this problem from occurring, the foot position of the CG model is specified beforehand on the reference plane (namely, the floor) of a virtual space, and motions of the feet are determined by functional approximation or the like, based on which the position of the CG model is determined by use of a method such as inverse cinema. However, because the above-mentioned method requires a high computational complexity, it is difficult to control a CG model real-time. The above-mentioned method also needs to determine the foot position beforehand, thereby making it difficult to freely move a CG model real-time by use of an external controller for example.

SUMMARY OF THE INVENTION

It is therefore an object of the present invention to provide a CG (Computer Graphics) model motion control system capable of imparting complex motions to a CG model by use of an input device of simplified constitution having a plurality of control units.

It is another object of the present invention to provide a CG model motion recording system capable of imparting complex motions to a CG model by use of an input device having simplified constitution and facilitating edit operations.

It is still another object of the present invention to provide a CG model position adjusting method capable of freely moving a CG model by use of an external controller for example while preventing CG model positions from becoming unnatural.

In a first aspect, the inventive apparatus is constructed for controlling a motion of a computer graphics model having a skeleton structure constituted by a plurality of articular elements manipulatable according to state values thereof. In the apparatus, input means has a plurality of control units, each of which is operable for time-sequentially inputting a control amount. Assignment means provides assignment information which determines correspondence between the control units of the input means and the articular elements of the computer graphics model. Parameter means provides a functional parameter which determines a relation between the control amount of each control unit and the state value of each articular element when the correspondence is determined between each control unit and each articular element according to the assignment information. Converter means operates based on the functional parameter for converting the control amount time-sequentially inputted by each control unit into a time-series of the state value of each articular element so that each articular element can be manipulated according to the time-series of the state value to effectuate the motion of the computer graphics model.

Preferably, the assignment means includes means for providing assignment information which determines correspondence between a single of the control units and a multiple of the articular elements so that the single of the control units can concurrently manipulate the multiple of the articular elements. Otherwise, the assignment means includes means for providing assignment information which determines correspondence between a multiple of the control units and a single of the articular elements so that the multiple of the control units can cooperate with one another to manipulate the single of the articular elements.

Specifically, the input means comprises a glove worn by a hand of an operator and having a plurality of control units disposed in contact with joints of fingers of the hand of the operator so that each control unit can detect an angular movement of each joint for inputting the control amount in terms of the detected angular movement.

Preferably, the parameter means comprises means for providing a functional parameter which determines a magnification rate of the control amount to compute the state value. Further, the parameter means comprises means for providing a functional parameter which determines an offset of the state value relative to the control amount. Moreover, the parameter means comprises means for providing a functional parameter which determines a polarity of the state value relative to the control amount. Additionally, the parameter means comprises means for providing a time-series of the functional parameter in parallel to the time-series of the state value.

In a second aspect, the inventive apparatus is constructed for recording a motion of a computer graphics model having a skeleton structure constituted by a plurality of articular elements manipulatable according to time-series data. In the apparatus, memory means has a plurality of record tracks corresponding to the plurality of the articular elements, each record track being separate from other record track and being writeable with the time-series data of the corresponding articular element. Select means is provided for selecting at least one record track to allow writing of the time-series data into the selected record track while inhibiting writing of the time-series data into the remaining record tracks. Edit means operates for providing the time-series data so that the provided time-series data can be exclusively written into the selected record track without disturbing the remaining record tracks.

Preferably, the inventive apparatus further comprises graphic means for reading the time-series data concurrently from the plurality of the record tracks so as to manipulate the plurality of the articular elements to thereby visually reproduce the motion of the computer graphics model while allowing the edit means to write the time-series data into the selected record track. In such a case, the edit means includes means for rewriting the time-series data of the selected record track while monitoring the motion of the computer graphics model to thereby enable real time correction in the manipulation of the articular element corresponding to the selected record track. Further, the edit means includes means operative when newly rewriting a part of the time-series data already written in the selected record track for interpolating a discontinuity between the newly rewritten part and the already written part so as to secure continuity of the time-series data.

In a third aspect, the inventive apparatus is constructed for controlling a motion of a computer graphics model having a skeleton structure constituted by a plurality of segments which are manipulatable according to time-series data. In the apparatus, input means operates for inputting the time-series data in correspondence with each of the segments. Graphic means is provided for manipulating the plurality of the segments according to the inputted time-series data so as to visually reproduce the motion of the computer graphics model on a horizontal plane. Adjustment means operates if the lowest one of the segments deviates from the horizontal plane during the motion of the computer graphics model for adjusting the time-series data of the lowest segment such that the lowest segment can stay on the horizontal plane. The adjustment means further comprises means operative if the lowest one of the segments staying on the horizontal plane drifts in a horizontal direction for adjusting the time-series data of the lowest segment such that the lowest segment can be fixed in the horizontal direction.

In carrying out the invention and according to the first aspect thereof, the CG model motion control apparatus comprises the assignment information specifying means for specifying information for assigning the control units of the input means to the articular elements (for example, joints) of a CG model, and the functional parameter specifying means for specifying functional parameters (for example, magnification rate, bending direction, and offset) indicative of a relationship between the control variable or amount inputted by each control unit and the state value (for example, joint angle or joint position) of each articular element. Altering these functional parameters in a variety of ways can provide a CG model with more diversified motions than those conventionally practiced. This allows the apparatus according to the present invention to impart as complex motions to a CG model as those imparted by the motion capture device with far simpler constitution than the motion capture apparatus, thereby significantly extending a range of CG model control.

For example, assignment of control units to articular elements or joints can be conducted on one-to-many or single-to-multiple basis to realize a motion such as simultaneously bending a plurality of joints of a foot or an arm of a CG model only by one control unit. Further, assignment of control units to a joint on many-to-one basis can provide a complex motion such as bending the head of the model forward and backward by use of a plurality of control units that provide only monotonous increment. For the input means, a fader or the like may be used. If an input glove as described before is used, a joint angle magnification rate, a bending direction, an offset value, and so on can be specified as functional parameters relative to a bending angle of each of the input glove fingers. Specifying the magnification rate allows a CG model to be moved in a large scale or a small scale by the operation of the control unit. Specifying the bending direction allows a plurality of control units to move an articular element of a CG model in opposite directions. Specifying the offset value can initialize the state value of the joint angle such that the input glove may be placed in a rest state while the CG model is held in a default attitude or posture. Recording the above-mentioned functional parameters in parallel to the time-series of the above-mentioned control variables or the state values in a time-sequence manner can correct operation of the CG model only by altering the corresponding functional parameter later.

In carrying out the invention and according to the second aspect thereof, a plurality of independent record tracks corresponding to articular elements of the model are set to memory means. Information for enabling or disabling the recording is set to each of the record tracks. Based on the inputted control variable, the time-series data is recorded onto only the enabled record track. If there is a large number of recording portions to be controlled, some of the portions can be additionally recorded sequentially, thereby controlling many articular elements with a small control variable. Therefore, according to the invention, complex motions can be imparted to a CG model through the simplified inputting means. In addition, based on the already stored time-series data, a CG model can be drawn real-time by graphic means and, concurrently with this CG model drawing, time-series data can be additionally recorded onto the enabled record track. Alternatively, the time-series data already recorded on the enabled record track can be rewritten real-time. This allows the user to add more minute motions and to modify partial motions while monitoring the already recorded CG model motions, thus facilitating recording and editing operations. Further, select and edit means can be imparted with capability of spanning by interpolation the discontinued portions before and after a boundary at which the time-series data has been rewritten, allowing the user to perform editing operation without impairing smooth motions of a CG model.

In carrying out the invention and according to the third aspect thereof, the reference position of a CG model is corrected in the vertical direction so that the CG model's lowest portion located at the bottom in the vertical direction of a virtual space is always in contact with the reference horizontal plane in the virtual space. Therefore, it is possible to avoid an unnatural phenomenon such as departing of the tip of the axial foot of the CG model from floor. Besides, the correction processing of the present invention only moves the reference position (for example, center of gravity) of the CG model in a vertical direction or vertical and horizontal directions, thereby making the processing simple and therefore enabling real-time processing. In addition, it is not required to specify a foot tip position and so on beforehand, hence a CG model can be freely controlled real-time by use of an external controller or the like. Further, according to this third aspect, the reference position of the CG model is corrected in the horizontal direction so that the CG model's portion located at the lowest position in the vertical direction in the virtual space is kept in contact with the reference plane and is not movable along the reference horizontal plane. This prevents an unnatural phenomenon such as horizontal sliding of the axial foot on the floor from occurring. In this case too, the correction processing simply moves the reference position of the CG model in the horizontal direction, so that the processing is very simple and it is unnecessary to specify the position of the foot tip beforehand. Consequently, the CG model can be controlled freely in real-time.

BRIEF DESCRIPTION OF THE DRAWINGS

These and other objects of the invention will be seen by reference to the description, taken in connection with the accompanying drawings, in which:

FIG. 4 is a diagram illustrating motions of the CG model shown in FIG. 2;

FIG. 5 is a diagram illustrating contents of time-series data for defining motions of the CG model shown in FIG. 2;

FIG. 8 is a diagram illustrating a dialog box for setting the assignment information and the functional parameters used in the CG apparatus shown in FIG. 1;

FIG. 9(a), FIG. 9(b) and FIG. 9(c) are diagrams illustrating operations for recording and editing time-series data used in the CG apparatus shown in FIG. 1;

FIG. 11 is a flowchart indicative of the correction process shown in FIGS. 10(a) and 10(b).

DETAILED DESCRIPTION OF PREFERRED EMBODIMENTS

This invention will be described in further detail by way of example with reference to the accompanying drawings.

Figure 1:
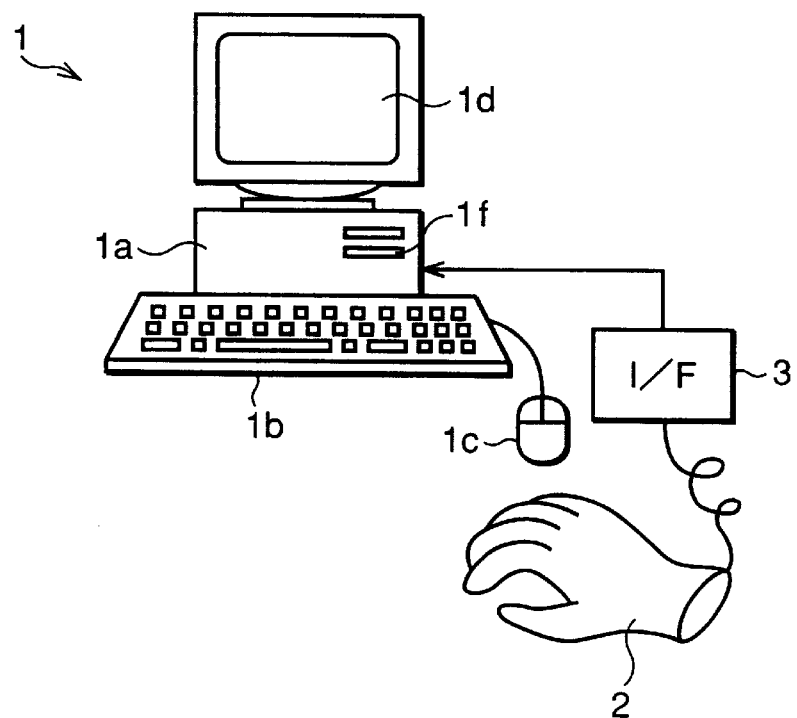
FIG. 1 is a schematic diagram illustrating constitution of a CG apparatus practiced as one preferred embodiment of the invention.

Now, referring to FIG. 1, there is shown constitution of a CG apparatus practiced as one preferred embodiment of the invention. As shown in the figure, this CG apparatus comprises a computer 1 for executing graphic process for generating and editing a three-dimensional (3D) computer graphics (CG) model, an input glove 2 serving as an input device for specifying a sequence of motions of the CG model, and an interface 3 for providing interface between the input glove 2 and the computer 1. The computer 1 is composed of a computer main frame 1a for executing a sequence of processing operations for imparting motions to the CG model based on a control amount or control variable received from the input glove 2, a keyboard 1b and a mouse 1c for specifying assignment information and functional parameters necessary for controlling CG model motions, and a display device 1d for displaying the generated CG model. Further, the computer main frame 1a contains therein a CPU and a disk drive for receiving a machine readable medium such as a floppy disk 1f.

Figure 2:
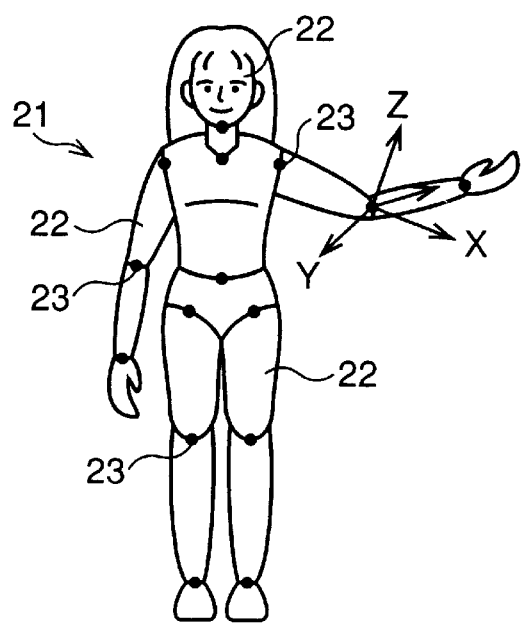
FIG. 2 is a diagram illustrating one example of a CG model to be presented by the CG apparatus shown in FIG. 1.

An example of a 3D CG model generated by the above-mentioned CG apparatus is shown in FIG. 2. In this example, a CG model 21 simulates a human body having a skeleton structure with a plurality of segments or parts 22 such as face, body, and arms connected to each other by joints 23 serving as articular elements indicated by nodes. This CG model 21 is presented in a three-dimensional virtual space according to source data or model data.

Figure 3B:
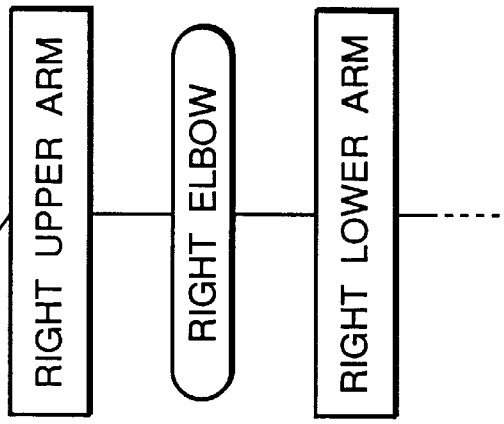
FIG. 3(a) and FIG. 3 (b) are diagrams illustrating formats of model data for defining a shape of the CG model shown in FIG. 2.
Figure 3A:
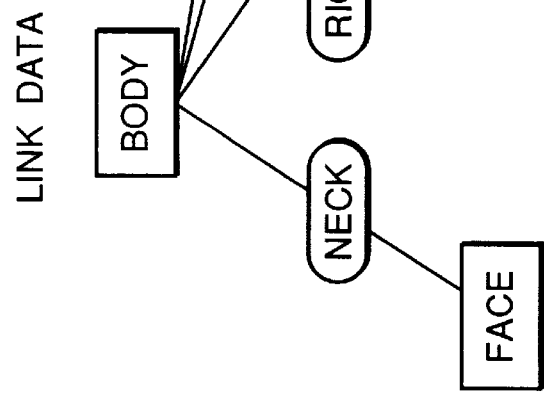

The model data is composed of shape data and link data as shown in FIGS. 3(a) and 3(b). The shape data is a file defining parts such as face and body as shown in FIG. 3(a). To be more specific, this file defines, for each of polygons constituting the respective parts, an apex sequence, plane list, surface texture, and so on. The link data is a file defining linkage between the parts as shown in FIG. 3(b). For example, in case of the human body model, the skeleton structure is defined such that the body is a parent part and the face, the right upper arm, the left upper arm, the waist, and so on linked to the body are child parts, and the right lower arm linked to the right upper arm is a grandchild part. At the same time, joints such as the neck, the right shoulder, the left shoulder, and so on linking these parts are defined. For each joint, a three-dimensional angle is defined. The joint angle is defined as a direction of a low-order part with reference to a local coordinate system of a high-order part as shown in FIG. 2. By defining such a link structure, the position of each part can be obtained only by specifying the three-dimensional position of the parent body in the virtual space.

As shown in FIG. 4, the joint angle of each joint is altered as a state value time-sequentially so as to impart a sequence of motions to the CG model. Data defining such a sequence of motions is herein referred to as time-series data.

The time-series data is a file defining an angle of each joint along a time axis as shown in FIG. 5. This file also defines a three-dimensional coordinate value of the parent part at each time. Data of a sequence of joint angles at each time is referred to as frame data marked by a dash block. For the state value, a position in the local coordinate system of each joint may also be used.

Figure 6:
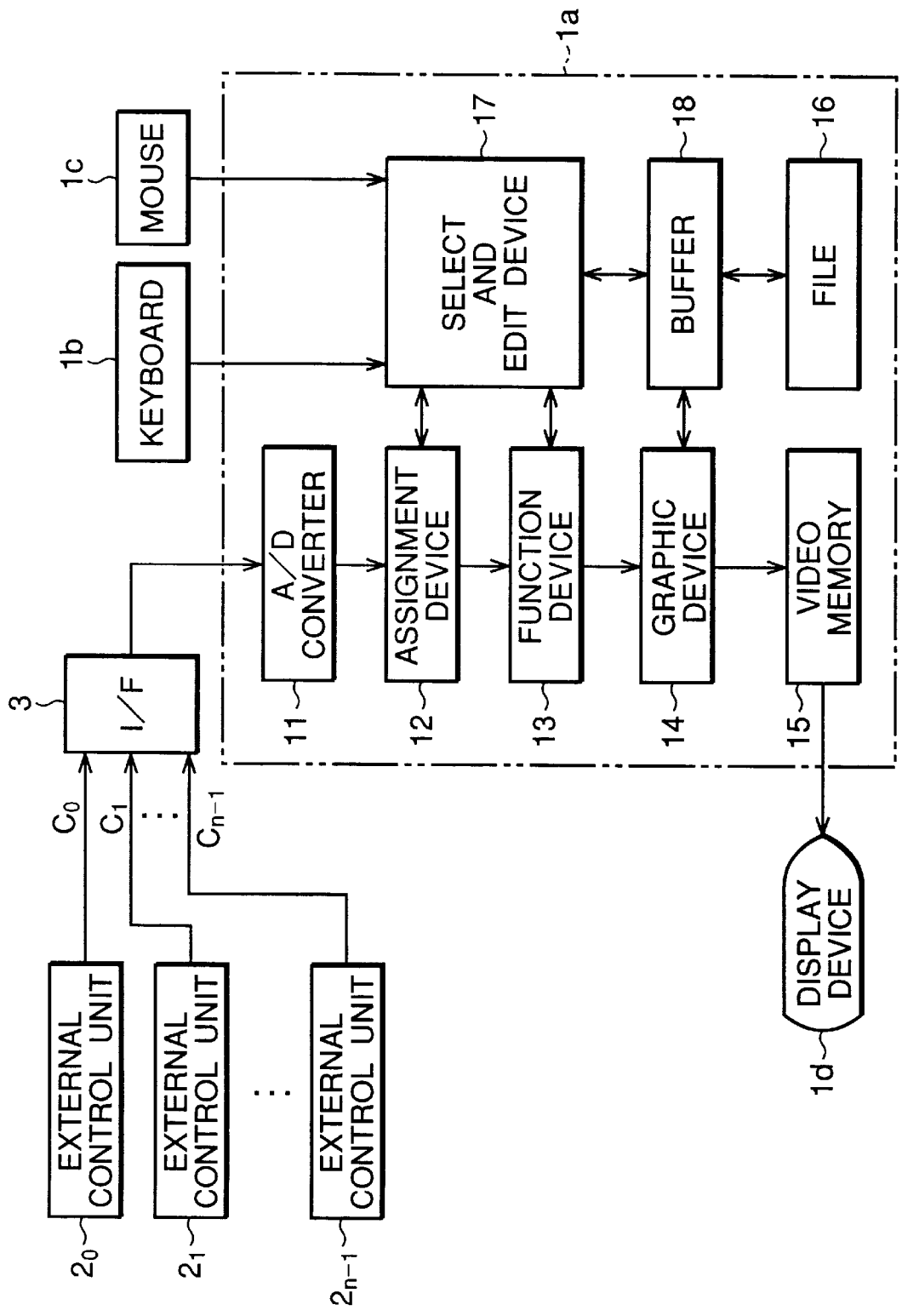
FIG. 6 is a block diagram illustrating constitution of a computer used in the CG apparatus shown in FIG. 1.

In order to generate the above-mentioned time-series data, the present CG apparatus has constitution as shown in FIG. 6. The input glove 2 has a plurality of external control units $2_0, 2_1, \ldots, 2_{n-1}$ arranged at positions of joints of each finger of the input glove. These external control units $2_0$ through $2_{n-1}$ detect bending angles of fingers of the operator by a change in electrical resistance or light quantity if an optical fiber is used as a sensor, and output signals corresponding to detected amounts as control variables $C_0, C_1, \ldots, C_{n-1}$. These control variables $C_0$ through $C_{n-1}$ are inputted in the computer main frame $1a$ through the interface 3.

In the computer main frame $1a$, an A/D converting device 11 converts the received analog control variables $C_0$ through $C_{n-1}$ into a digital form suitable for 3D CG model data. An assignment device 12 assigns each of the control variables $C_0$ through $C_{n-1}$ to the joints respectively based on the assignment information for specifying the correspondence between the external control units $2_0$ through $2_{n-1}$ and the joints of the CG model. A function device 13 converts the control variable assigned to each joint based on functional parameters such as magnification rate, change direction, and offset value of each joint so as to compute the state value or the joint angle of each joint. Based on the obtained joint angle, a graphic device 14 draws the CG model in a video memory 15. The model data for defining the CG model is read from a file storage device 16.

To record a motion of the CG model, the control variables are stored along with the assignment information and the functional parameters such as bending direction, magnification rate, and offset value into a buffer 18 as the time-series data under the control of a select and edit device 17. To redraw the CG model according to the time-series data, the control variables stored in the buffer 18 are converted by the function device 13 into the angle of each joint. The data stored in the buffer 18 can be edited appropriately by the select and edit device 17. In this case, the edited data is also stored in the buffer 18. These pieces of stored time-series data are appropriately transferred to the file storage device 16 as the time-series data.

Figure 7:
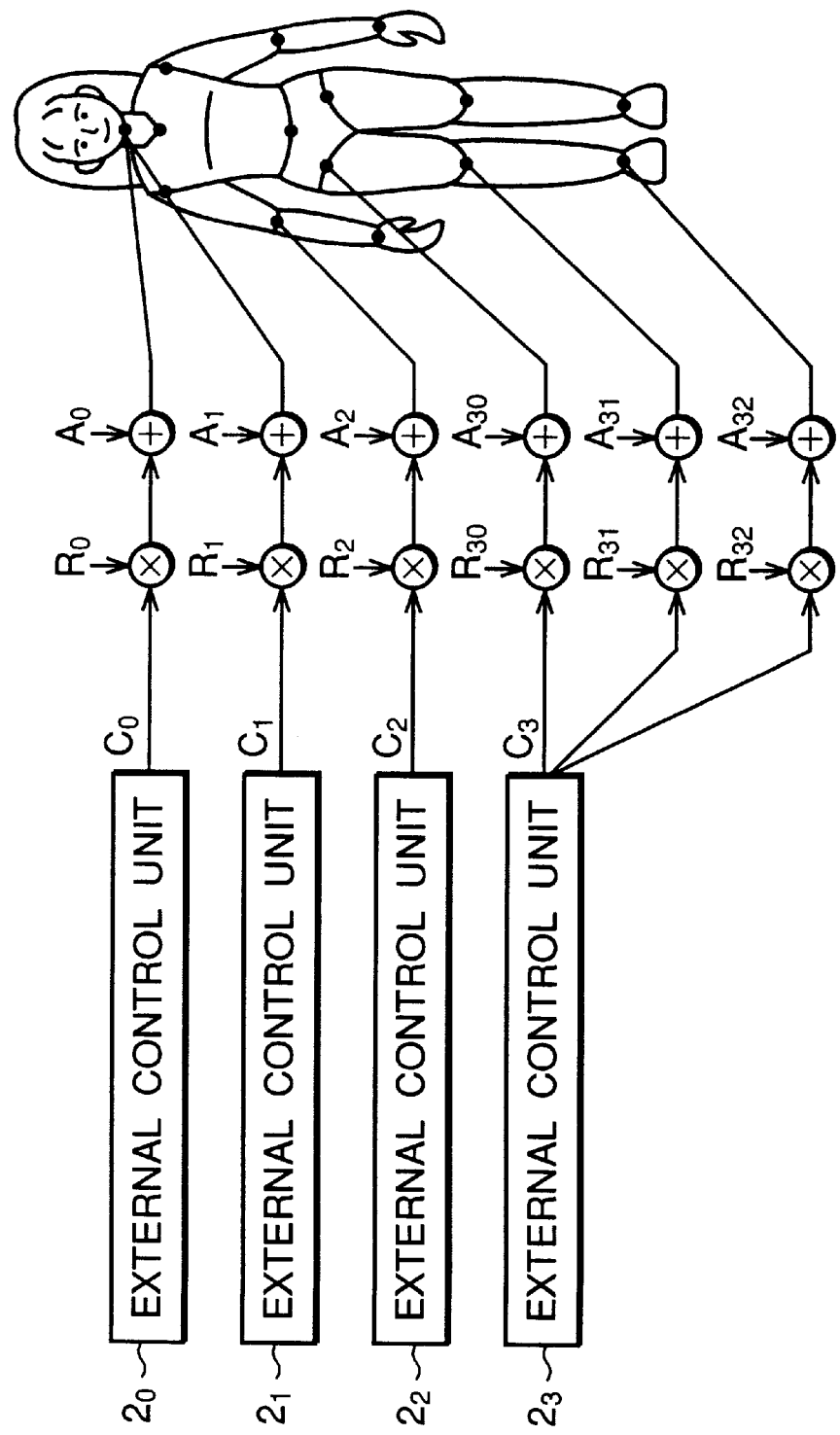
FIG. 7 is a diagram illustrating assignment of control units to articular elements of the CG model shown in FIG. 2 and associated functional parameters.

FIG. 7 shows an example of assignment of the external control units $2_0$ through $2_{n-1}$ to the joints of the CG model representative of a human body, and an example of functional parameters corresponding to the joints of the CG model. The external control units $2_0$ and $2_1$ are assigned to the neck of the human body model on many-to-one basis, and the magnification rates R0 and R1 are set to a positive value and a negative value, respectively. While the control variables $C_0$ and $C_1$ increment monotonously, the neck can be moved forward and backward or left-side and right-side by two fingers. The external control unit $2_2$ is assigned to the right elbow joint on one-to-one basis. The external control unit $2_3$ is assigned to the right loin joint, the right knee joint, and the right ankle on one-to-many basis. By appropriately setting magnification rates or gains $R_{30}$, $R_{31}$, and $R_{32}$ and offset values $A_{30}$, $A_{31}$, and $A_{32}$, motion of the entire right leg such as folding and unfolding is controlled by one finger.

The above-mentioned assignment information and the functional parameters are displayed on the display device $1d$. For example, these assignment information and functional parameters can be set by use of a joint assignment dialog box shown in FIG. 8. This dialog box has windows for inputting the name of file for storing the assignment information and functional parameters, information indicative of enabling/disabling of recording, the joints of the input device 2, the corresponding joints of the model, magnification rates in X, Y, and Z directions, and the offset values in X, Y, and Z directions.

The function device 13 computes the joint angles as shown below from the assignment information and the functional parameters which are set as described above. To be more specific, let revolving angles around the X-axis of each joint of the CG model be $X_0, X_1, \ldots, X_{m-1}$, the magnification rates be $R_{00}, R_{01}, \ldots, R_{m-1n-1}$, the offset values be $A_0, A_1, \ldots, A_{m-1}$, and the control variables be $C_0$, $C_1, \ldots, C_{n-1}$, then the joint angles around the X-axis of the joints can be obtained as follows:

$$\begin{bmatrix} X_0 \\ X_1 \\ X_2 \\ \vdots \\ \vdots \\ X_{m-1} \end{bmatrix} = \begin{bmatrix} R_{00} & R_{01} & R_{02} & \cdots & R_{0n-1} & A_0 \\ R_{10} & R_{11} & R_{12} & \cdots & R_{1n-1} & A_1 \\ R_{20} & R_{21} & R_{22} & \cdots & R_{2n-1} & A_2 \\ \vdots & \vdots & \vdots & \ddots & \vdots & \vdots \\ \vdots & \vdots & \vdots & \ddots & \vdots & \vdots \\ R_{m-10} & R_{m-11} & R_{m-12} & \cdots & R_{m-1n-1} & A_{m-1} \end{bmatrix} \begin{bmatrix} C_0 \\ C_1 \\ C_2 \\ \vdots \\ C_{n-1} \\ 1 \end{bmatrix}$$

The joint angles around the Y-axis and the Z-axis can be obtained in similar manner. In the conventional CG apparatus in which the relationship between control units and joints is only one-to-one, only diagonal elements of R exist, and the matrix in which other values including offsets A are all zeros is used. In the CG apparatus according to the present invention, if the column elements of R has a plurality of values other than zero, the control unit and the joints correspond to each other on a one-to-many basis; if the row elements of R has a plurality of values other than zero, the control elements and the joint correspond to each other on many-to-one basis.

When the finger of the operator for operating the input glove 2 is placed in an unnatural state away from a rest state, the CG model should not be designed in a default state or rest state in order to prevent fatigue of the operator. Therefore, the offset value A is adjusted such that the CG model gets in default state by the control variables $C_0$ through $C_{n-1}$ inputted from the external control units $2_0$ through $2_{n-1}$ when the finger of the operator is at an angle at which the finger is most relaxed. The functional parameters can also limit the maximum and minimum values of joint angle. In addition, for the input means containing a plurality of control units, a fader for example is also available in place of the input glove.

As described above, according to the first aspect of the invention, the CG apparatus is constructed for controlling a motion of a computer graphics model having a skeleton structure constituted by a plurality of joints or articular elements manipulatable according to state values thereof. In the CG apparatus, input means in the form of the input glove 2 has a plurality of control units, each of which is operable for time-sequentially inputting a control variable or control amount. Assignment means in the form of the assignment device 12 provides assignment information which determines correspondence between the control units of the input means and the articular elements of the computer graphics model. Parameter means in the form of the function device 13 provides a functional parameter which determines a relation between the control amount of each control unit and the state value of each articular element when the correspondence is determined between each control unit and each articular element according to the assignment information. Converter means also in the form of the function device 13 operates based on the functional parameter for converting the control amount time-sequentially inputted by each control unit into a time-series of the state value of each articular element so that each articular element can be manipulated according to the time-series of the state value to effectuate the motion of the computer graphics model.

Preferably, the assignment means includes means for providing assignment information which determines correspondence between a single of the control units and a multiple of the articular elements so that the single of the control units can concurrently manipulate the multiple of the articular elements. Otherwise, the assignment means includes means for providing assignment information which determines correspondence between a multiple of the control units and a single of the articular elements so that the multiple of the control units can cooperate with one another to manipulate the single of the articular elements.

Specifically, the input means comprises the input glove 2 worn by a hand of an operator and having a plurality of control units disposed in contact with joints of fingers of the hand of the operator so that each control unit can detect an angular movement of each joint for inputting the control amount in terms of the detected angular movement.

Preferably, the parameter means comprises means for providing a functional parameter which determines a magnification rate of the control amount to compute the state value. Further, the parameter means comprises means for providing a functional parameter which determines an offset of the state value relative to the control amount. Moreover, the parameter means comprises means for providing a functional parameter which determines a polarity of the state value relative to the control amount. Additionally, the parameter means comprises means for providing a time-series of the functional parameter in parallel to the time-series of the state value.

FIGS. 9(a), 9(b), and 9(c) are diagrams illustrating procedure of editing the time-series data generated by the above-mentioned operations. In the present CG apparatus, the data of each joint of the CG model is recorded in the buffer 18 at each record track. Recording of the data can be enabled or disabled for each track. The information of this enabling or disabling can be specified through a check box provided in the dialog box shown in FIG. 8 for example, and the specification is registered in the select and edit device 17. The select and edit device 17 records the data only in the enabled record track based on the registered information of enabling or disabling. For example, in the example shown in FIG. 9(a), only the tracks assigned to the left shoulder, left crotch, right crotch, left knee, and left knee are enabled for recording of the data, while the other tracks are disabled for recording. This operation is suitable for recording a motion in which the CG model raises its left shoulder while walking.

If an operation error causes an unnecessary motion before the motion of raising the left shoulder is conducted, only the track assigned for recording the joint angle of the left shoulder is made enabled for correction as shown in FIG. 9(b). Then the erroneous data is erased from the selectively enabled track while reproducing the CG model. As a result of the erasure, discontinuation occurs between the erased data and the reserved data before and after the erased data. Thus, the select and edit device 17 performs interpolation on the discontinuous portions. Therefore, only the portion in which the left shoulder erroneously moves can be corrected while maintaining continuity of the motion of the CG model.

If it is desired to add motions of the neck and the right elbow for example to the motions recorded so far, only the tracks corresponding to the joints of the neck and the right elbow are enabled for recording the data as shown in FIG. 9(c), thereby additionally recording the data of these parts or segments.

According to the above-mentioned recording and editing method, minor motions can be added to major motion, and the recorded time-series data can be partially deleted or edited, thereby performing a highly efficient animation generating and editing operation. Further, the joints of a model can be divided into several groups to sequentially record the joint motions for each group. This can impart more joint motions with a limited number of control units.

As described above, according to the second aspect of the invention, the CG apparatus is constructed for recording a motion of a computer graphics model having a skeleton structure constituted by a plurality of articular elements manipulatable according to time-series data. In the CG apparatus, memory means in the form of the buffer 18 has a plurality of record tracks corresponding to the plurality of the articular elements, each record track being separate from other record track and being writeable with the time-series data of the corresponding articular element. Select means is provided in the form of the select and edit device 17 for selecting at least one record track to allow writing of the time-series data into the selected record track while inhibiting writing of the time-series data into the remaining record tracks. Edit means in the select and edit device 17 operates for providing the time-series data so that the provided time-series data can be exclusively written into the selected record track without disturbing the remaining record tracks.

Preferably, the inventive CG apparatus further comprises graphic means in the form of the graphic device 14 for reading the time-series data concurrently from the plurality of the record tracks so as to manipulate the plurality of the articular elements to thereby visually reproduce the motion of the computer graphics model while allowing the edit means to write the time-series data into the selected record track. In such a case, the edit means includes means for rewriting the time-series data of the selected record data while monitoring the motion of the computer graphics model to thereby enable real time correction in the manipulation of the articular element corresponding to the selected record track. Further, the edit means includes means operative when newly rewriting a part of the time-series data already written in the selected record track for interpolating a discontinuity between the newly rewritten part and the already written part so as to secure continuity of the time-series data.

Figure 10A:
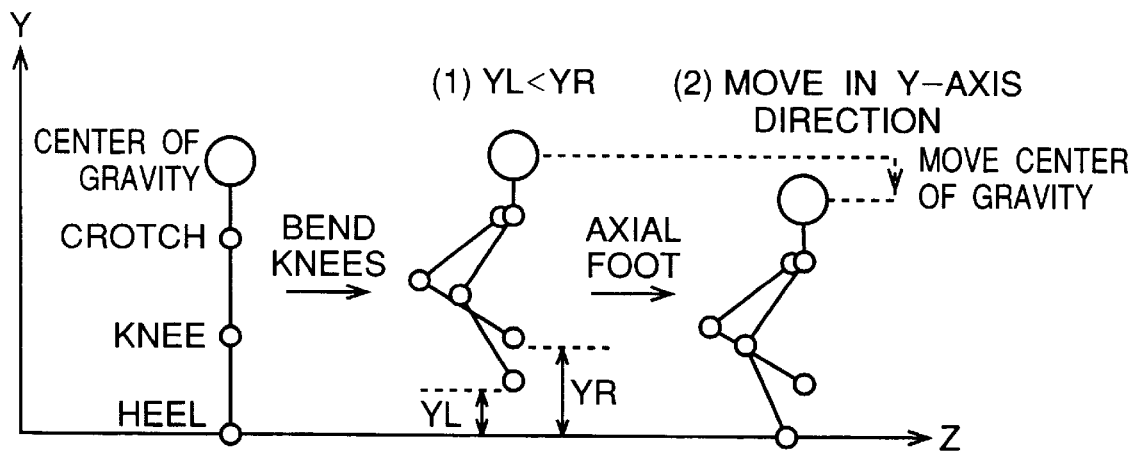
FIG. 10(a) and FIG. 10(b) are diagrams illustrating process for correcting the center of gravity of the model treated in the CG apparatus shown in FIG. 1.
Figure 10B:
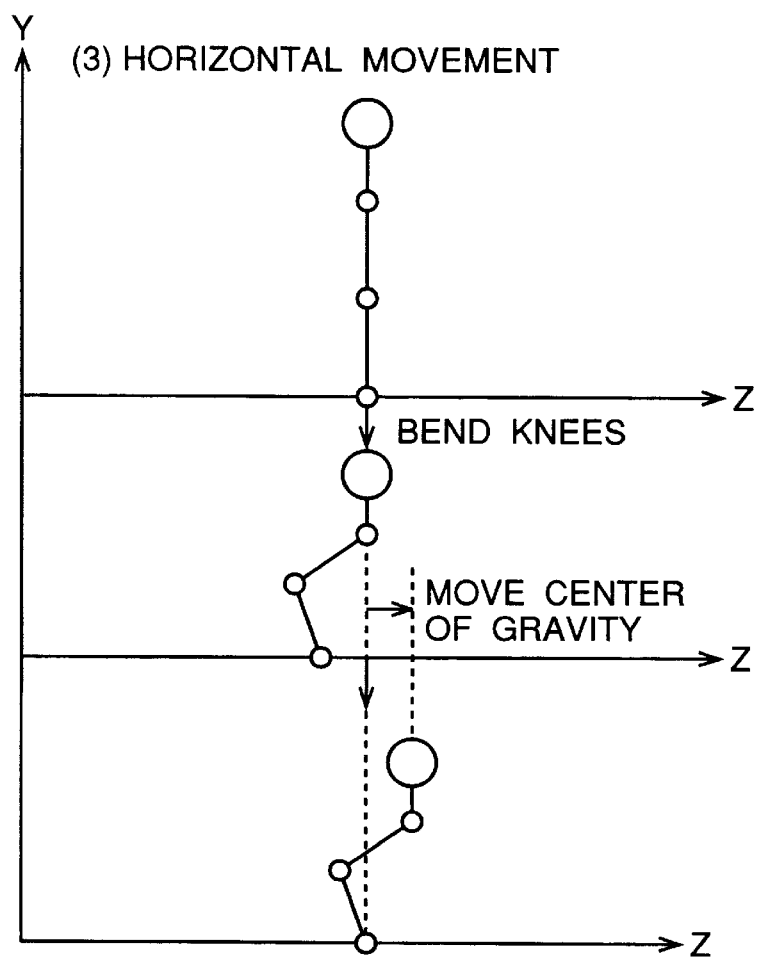

In the CG model having a skeleton structure as described above, when the coordinate value of the parent part and the joint angle or position are given, the positions or attitudes of all parts can be obtained. The coordinate value of the parent part is normally set to the position of the waist or pelvis. For example, when the knees are bent, if no processing is performed on the coordinate value of the parent part, an unnatural motion in which the feet float in the air occurs. To prevent this from occurring, the select and edit device 17 determines the foot of which distance YL or YR between foot and floor is smaller than that of the other to be the axial foot as shown in FIG. 10(a), thereby adjusting the position of the model in the vertical direction such that the tip of the axial foot is always in contact with floor. If the axial foot in contact with floor moves horizontally as shown in FIG. 10(b), the position of the model in the horizontal direction is adjusted such that the axial foot will not move.

FIG. 11 is a flowchart indicative of the processing for correcting the center of gravity of the model by the select and edit device 17. First, the coordinate value of the tip of the foot is obtained (step S1). The Y coordinate (height) of the right foot is compared with the Y coordinate of the left foot (step S2). If the Y coordinate of the right foot is smaller than the Y coordinate of the left foot, the right foot is determined to be the axial foot, thereby correcting the coordinate of the center of gravity as shown in the following equations (step S3):

Y coordinate of the center of gravity=Y coordinate of the center of gravity−Y coordinate of right foot X coordinate of the center of gravity=X coordinate of the center of gravity−(X coordinate of right foot−stored X coordinate of right foot)

Z coordinate of the center of gravity=Z coordinate of the center of gravity−(Z coordinate of right foot−stored Z coordinate of right foot)

As shown in the above-mentioned equations, if the axial foot is not in contact with floor, the Y coordinate of the center of gravity moves by Y-direction distance in which the axial foot touches floor. As for the X and Z directions, the position of the center of gravity moves by a change in the X and Z coordinates of the axial foot between the current frame and the preceding frame. Consequently, the center of gravity moves with the axial foot itself fixed to one point. When the axial foot is in contact with floor, the Y coordinate of the axial foot is zero, so that the Y coordinate of the center of gravity remains unchanged. In this case, however, it is possible that the axial foot moves horizontally, so that the X and Z coordinates of the center of gravity are obtained. If there is no change in the X and Z coordinates of the axial foot between the current frame and the preceding frame, no horizontal movement occurs, and therefore the X and Z coordinates of the center of gravity remain unchanged.

Likewise, if the Y coordinate of the right foot is larger than the Y coordinate of the left foot, the left foot is determined to be the axial foot and the coordinates of the center of gravity are corrected as shown in the following equations (step S4):

Y coordinate of the center of gravity=Y coordinate of the center of gravity−Y coordinate of left foot X coordinate of the center of gravity=X coordinate of the center of gravity−(X coordinate of left foot−stored X coordinate of left foot)

Z coordinate of the center of gravity=Z coordinate of the center of gravity−(Z coordinate of left foot−stored Z coordinate of left foot)

Then, the X and Z coordinates of the left and right feet are stored for a next frame computation, upon which the processing comes to an end (step S5).

Starting the above-mentioned processing every time the control variable is sampled can correct the coordinate values real-time, thereby generating the time-series data while checking the corrected CG model motions. Also, the above-mentioned processing may be performed on the stored data to perform the correction operation on a batch basis. Especially, since this processing can be performed simply by moving the coordinates of the center of gravity for each frame, this processing is suitable for real-time processing, thereby realizing agreeable control of CG model motions. It should be noted that the above-mentioned sequence of CG model motion control operation can be implemented by a CG model motion control program for example. This program is provided by means of the machine readable medium such as the floppy disk $1f$ shown in FIG. 1.

As described above, according to the third aspect of the invention, the CG apparatus is constructed for controlling a motion of a computer graphics model having a skeleton structure constituted by a plurality of segments which are manipulatable according to time-series data. In the CG apparatus, input means such as the input glove 2 operates for inputting the time-series data in correspondence with each of the segments. Graphic means is provided in the form of the graphic device 14 for manipulating the plurality of the segments according to the inputted time-series data so as to visually reproduce the motion of the computer graphics model on a horizontal plane. Adjustment means in the graphic device 14 operates if the lowest one of the segments deviates from the horizontal plane during the motion of the computer graphics model for adjusting the time-series data of the lowest segment such that the lowest segment can stay on the horizontal plane. The adjustment means further comprises means operative if the lowest one of the segments staying on the horizontal plane drifts in a horizontal direction for adjusting the time-series data of the lowest segment such that the lowest segment can be fixed in the horizontal direction.

Lastly, referring back to FIG. 6, the inventive computer graphics apparatus is constructed for presenting on the display device $1d$ a motion of an object defined by a plurality of articular segments manipulatable according to state values thereof. In the computer graphics apparatus, the input device 2 has a plurality of control units $2_0, 2_1, \ldots, 2_{n-1}$ each of which is operable for time-sequentially inputting a control amount. The assignment device 12 provides assignment information which defines correspondence between the control units of the input device 2 and the articular segments of the object. The function device 13 provides a functional parameter which defines a relation between the control amount of each control unit and the state value of each articular segment when the correspondence is defined between each control unit and each articular segment according to the assignment information. The function device 13 further operates based on the functional parameter for converting the control amount time-sequentially inputted by each control unit into a time-series of the state value of each articular segment. The graphic device 14 graphically manipulates each articular segment according to the time-series of the state value to present the motion of the object on the display device $1d$. The inventive computer graphics apparatus further utilizes the memory device or the buffer 18 having a plurality of record tracks corresponding to the plurality of the articular segments, each record track being separate from other record track and being writeable with data equivalent to the time-series of the state value of the corresponding articular segment. The select and edit device 17 selects at least one record track to allow writing of the data into the selected record track while inhibiting writing of the data into the remaining record tracks, and records the data in the memory device so that the data can be exclusively written into the selected record track without disturbing the remaining record tracks. In such a case, the graphic device 14 reads the data concurrently from the plurality of the record tracks so as to manipulate the plurality of the articular segments to thereby visually reproduce the motion of the object while allowing the select and edit device 17 to write the data into the selected record track. The select and edit device 17 rewrites the data of the selected record track while monitoring the motion of the object, thereby enabling real time correction in the manipulation of the articular segment corresponding to the selected record track. The graphic device 14 manipulates the plurality of the articular segments according to the time-series of the state values so as to present the motion of the object placed on a horizontal plane. The graphic device 14 operates if the lowest one of the articular segments deviates from the horizontal plane during the motion of the object for adjusting the state value of the lowest articular segment such that the lowest articular segment can stay on the horizontal plane. Further, the graphic device 14 operates if the lowest one of the articular segments staying on the horizontal plane drifts in a horizontal direction for adjusting the state value of the lowest articular segment such that the lowest articular segment can be fixed in the horizontal direction.

The present invention covers the machine readable medium such as the floppy disk if for use in the computer graphics apparatus having a CPU for controlling a motion of a computer graphics model having a skeleton structure constituted by a plurality of articular elements manipulatable according to state values thereof. The medium contains program instructions executable by the CPU for causing the computer graphics apparatus to perform the method comprising the steps of operating a plurality of control units so that each of the control units time-sequentially inputs a control amount, providing assignment information which determines correspondence between the control units and the articular elements of the computer graphics model, providing a functional parameter which determines a relation between the control amount of each control unit and the state value of each articular element when the correspondence is determined between each control unit and each articular element according to the assignment information, and converting the control amount based on the functional parameter into a time-series of the state value of each articular element so that each articular element can be manipulated according to the time-series of the state value to effectuate the motion of the computer graphics model. The machine readable medium may contain program instructions executable by the CPU for causing the computer graphics apparatus to perform the method comprising the steps of defining in a memory a plurality of record tracks corresponding to the plurality of the articular elements, each record track being separate from other record track and being writeable with the time-series data of the corresponding articular element, selecting at least one record track to allow writing of the time-series data into the selected record track while inhibiting writing of the time-series data into the remaining record tracks, and providing the time-series data so that the provided time-series data can be exclusively written into the selected record track without disturbing the remaining record tracks. The machine readable medium may contain program instructions executable by the CPU for causing the computer graphics apparatus to perform the method comprising the steps of inputting the time-series data in correspondence with each of the segments, manipulating the plurality of the segments according to the inputted time-series data so as to visually reproduce the motion of the computer graphics model on a horizontal plane, and adjusting the time-series data of the lowest one of the segments if the lowest segment deviates from the horizontal plane so that the lowest segment can stay on the horizontal plane during the motion of the computer graphics model.

As described and according to the first aspect of the invention, the CG apparatus comprises assignment information specifying means for specifying information for assigning the control units of the input means to the joints or articular elements of a CG model, and functional parameter specifying means for specifying functional parameters indicative of a relationship between the control variable or control amount of each control unit and the state value of each articular element. Altering these functional parameters in a variety of ways can provide the CG model with more diversified motions than those conventionally practiced. This allows the CG apparatus according to the present invention to impart as complex motions to the CG model as those imparted by the motion capture CG device with far simpler constitution than the motion capture CG device; thereby significantly extending a range of CG model.

As described and according to the second aspect of the invention, a plurality of independent record tracks corresponding to a plurality of articular elements of the CG model are set to memory means. Information for enabling or disabling the recording is set to each of the record tracks. Based on the inputted control variable, the time-series data is recorded onto only the enabled record track. If there is a large number of recording portions to be controlled, some of the portions can be additionally recorded sequentially, thereby controlling many articular elements with a small control variable. Therefore, according to the invention, complex motions can be imparted to a CG model through the simplified inputting means.

As described and according to the third aspect of the invention, the reference position of a CG model is corrected in the vertical direction so that the CG model's portion located at the bottom in the vertical direction of a virtual space is always in contact with the reference horizontal plane in the virtual space. Therefore, an unnatural phenomenon such as departing of the tip of the axial foot of the CG model from floor or sliding of the axial foot on the floor for example does not occur. Besides, the above-mentioned processing is very simple, and it is unnecessary to specify the position of the foot tip beforehand. Consequently, the CG model can be controlled freely in real-time.

While the preferred embodiment of the present invention has been described using specific terms, such description is for illustrative purposes only, and it is to be understood that changes and variations may be made without departing from the spirit or scope of the appended claims.

What is claimed is:

1. An apparatus for controlling a motion of a computer graphics model having a skeleton structure constituted by a plurality of articular elements manipulatable according to state values thereof, the apparatus comprising:

input means having a plurality of control units that correspond to the articular elements of the skeleton structure, each of which is operable for time-sequentially inputting a control amount for its corresponding articular element;

assignment means for providing assignment information which determines correspondence between the control units of the input means and the articular elements of the computer graphics model;

parameter means for providing a functional parameter which determines a relation between the control amount of each control unit and the state value of each corresponding articular element when the correspondence is determined between each control unit and each articular element according to the assignment information; and converter means operative based on the functional parameter for converting the control amount time-sequentially inputted by each control unit into a time-series of the state value of each corresponding articular element so that each corresponding articular element can be manipulated according to its time-series of the state value to effectuate the motion of the computer graphics model in real time, wherein the control amount time-sequentially inputted by each control unit is provided continuously and in real time, the time-series of the state value of each corresponding articular element being converted from the control amount continuously and in parallel with the control amount.

2. The apparatus according to claim 1, wherein the assignment means includes means for providing assignment information which determines correspondence between a single of the control units and a multiple of the articular elements so that the single of the control units can concurrently manipulate the multiple of the articular elements.

3. The apparatus according to claim 1, wherein the assignment means includes means for providing assignment information which determines correspondence between a multiple of the control units and a single of the articular elements so that the multiple of the control units can cooperate with one another to manipulate the single of the articular elements.

4. The apparatus according to claim 1, wherein the input means comprises a glove worn by a hand of an operator and having a plurality of control units disposed in contact with joints of fingers of the hand of the operator so that each control unit can detect an angular movement of each joint for inputting the control amount in terms of the detected angular movement.

5. The apparatus according to claim 1, wherein the parameter means comprises means for providing a functional parameter which determines a magnification rate of the control amount to compute the state value.

6. The apparatus according to claim 1, wherein the parameter means comprises means for providing a functional parameter which determines an offset of the state value relative to the control amount.

7. The apparatus according to claim 1, wherein the parameter means comprises means for providing a functional parameter which determines a polarity of the state value relative to the control amount.

8. The apparatus according to claim 1, wherein the parameter means comprises means for providing a time-series of the functional parameter in parallel to the time-series of the state value.

9. An apparatus for recording a motion of a computer graphics model having a skeleton structure constituted by a plurality of articular elements manipulatable according to time-series data, the apparatus comprising:

memory means having a plurality of record tracks corresponding to the plurality of the articular elements, each record track being separate from other record track and being writeable with the time-series data of the corresponding articular element;

select means for selecting at least one record track to allow writing in sequence of the time-series data for the corresponding articular element into the selected record track while inhibiting writing of the time-series data into the remaining record tracks; and edit means operable for providing the time-series data in sequence so that the provided time-series data can be exclusively written into the selected record track in sequence without disturbing the remaining record tracks, wherein at least two time-series data are written in sequence to the selected record track.

10. An apparatus for recording a motion of a computer graphics model having a skeleton structure constituted by a plurality of articular elements manipulatable according to time-series data, the apparatus comprising:

memory means having a plurality of record tracks corresponding to the plurality of the articular elements, each record track being separate from other record track and being writeable with the time-series data of the corresponding articular element;

select means for selecting at least one record track to allow writing of the time-series data into the selected record track while inhibiting writing of the time-series data into the remaining record tracks;

edit means operable for providing the time-series data so that the provided time-series data can be exclusively written into the selected record track without disturbing the remaining record tracks; and graphic means for reading the time-series data concurrently from the plurality of the record tracks so as to manipulate the plurality of the articular elements to thereby visually reproduce the motion of the computer graphics model while allowing the edit means to write the time-series data into the selected record track.

11. The apparatus according to claim 10, wherein the edit means includes means for rewriting the time-series data of the selected record data while monitoring the motion of the computer graphics model to thereby enable real time correction in the manipulation of the articular element corresponding to the selected record track.

12. The apparatus according to claim 11, wherein the edit means includes means operative when newly rewriting a part of the time-series data already written in the selected record track for interpolating a discontinuity between the newly rewritten part and the already written part so as to secure continuity of the time-series data.

13. An apparatus for controlling a motion of a computer graphics model having a skeleton structure constituted by a plurality of segments which are manipulatable according to time-series data, the apparatus comprising:

input means operable for inputting the time-series data in correspondence with each of the segments;

graphic means for manipulating the plurality of the segments according to the inputted time-series data so as to visually reproduce the motion of the computer graphics model on a horizontal plane; and adjustment means operative when the lowest one of the segments deviates from the horizontal plane during the motion of the computer graphics model for adjusting the time-series data of the lowest segment in real time such that the lowest segment is made to stay on the horizontal plane, wherein such deviation is caused by a movement in at least one of the segments above the lowest one of the segments.

14. The apparatus according to claim 13, wherein the adjustment means further comprises means operative if the lowest one of the segments staying on the horizontal plane drifts in a horizontal direction for adjusting the time-series data of the lowest segment such that the lowest segment can be fixed in the horizontal direction.

15. A computer graphics apparatus for presenting on a display a motion of an object defined by a plurality of articular segments manipulatable according to state values thereof, the computer graphics apparatus comprising:

an input device having a plurality of control units that correspond to the articular segments of the skeleton structure, each of which is operable for time-sequentially inputting a control amount for its corresponding articular segment;

an assignment device that provides assignment information which defines correspondence between the control units of the input device and the articular segments of the object;

a function device that provides a functional parameter which defines a relation between the control amount of each control unit and the state value of each corresponding articular segment when the correspondence is defined between each control unit and each articular segment according to the assignment information, the function device further operating based on the functional parameter for converting the control amount time-sequentially inputted by each control unit into a time-series of the state value of each articular segment, wherein the control amount time-sequentially inputted by each control unit is provided continuously and in real time, the time-series of the state value of each corresponding articular segment being converted from the control amount continuously and in parallel with the control amount; and a graphic device that graphically manipulates each articular segment according to the time-series of the state value to present the motion of the object on the display in real time.

16. A computer graphics apparatus according to claim 15, wherein the assignment device provides assignment information which determines correspondence between a single of the control units and a multiple of the articular segments so that the single of the control units can concurrently manipulate the multiple of the articular segments.

17. A computer graphics apparatus according to claim 15, wherein the assignment device provides assignment information which determines correspondence between a multiple of the control units and a single of the articular segments so that the multiple of the control units can cooperate with one another to manipulate the single of the articular segments.

18. A computer graphics apparatus according to claim 15, wherein the input device comprises a glove worn by a hand of an operator and having a plurality of control units disposed in contact with joints of fingers of the hand of the operator so that each control unit can detect an angular movement of each joint for inputting the control amount in terms of the detected angular movement.

19. A computer graphics apparatus according to claim 15, wherein the function device provides a functional parameter which determines a magnification rate of the control amount used to convert the control amount into the state value.

20. A computer graphics apparatus according to claim 15, further comprising a memory device having a plurality of record tracks corresponding to the plurality of the articular segments, each record track being separate from other record track and being writeable with data equivalent to the time-series of the state value of the corresponding articular segment, a select device that selects at least one record track to allow writing of the data into the selected record track while inhibiting writing of the data into the remaining record tracks, and an edit device that records the data in the memory device so that the data can be exclusively written into the selected record track without disturbing the remaining record tracks.

21. A computer graphics apparatus according to claim 15, wherein the graphic device manipulates the plurality of the articular segments according to the time-series of the state values so as to present the motion of the object placed on a horizontal plane, the graphic device operating if the lowest one of the articular segments deviates from the horizontal plane during the motion of the object for adjusting the state value of the lowest articular segment such that the lowest articular segment can stay on the horizontal plane.

22. A computer graphics apparatus for presenting on a display a motion of an object defined by a plurality of articular segments manipulatable according to state values thereof, the computer graphics apparatus comprising:

an input device having a plurality of control units, each of which is operable for time-sequentially inputting a control amount;

an assignment device that provides assignment information which defines correspondence between the control units of the input device and the articular segments of the object;

a function device that provides a functional parameter which defines a relation between the control amount of each control unit and the state value of each articular segment when the correspondence is defined between each control unit and each articular segment according to the assignment information, the function device further operating based on the functional parameter for converting the control amount time-sequentially inputted by each control unit into a time-series of the state value of each articular segment;

a graphic device that graphically manipulates each articular segment according to the time-series of the state value to present the motion of the object on the display;

a memory device having a plurality of record tracks corresponding to the plurality of the articular segments, each record track being separate from other record track and being writeable with data equivalent to the time-series of the state value of the corresponding articular segment;

a select device that selects at least one record track to allow writing of the data into the selected record track while inhibiting writing of the data into the remaining record tracks; and an edit device that records the data in the memory device so that the data can be exclusively written into the selected record track without disturbing the remaining record tracks, wherein the graphic device reads the data concurrently from the plurality of the record tracks so as to manipulate the plurality of the articular segments to thereby visually reproduce the motion of the object while allowing the edit device to write the data into the selected record track.

23. A computer graphics apparatus according to claim 22, wherein the edit device rewrites the data of the selected record track while monitoring the motion of the object, thereby enabling real time correction in the manipulation of the articular segment corresponding to the selected record track.

24. A computer graphics apparatus according to claim 23, wherein the edit device operates when newly rewriting a part of the data already written in the selected record track for interpolating a discontinuity between the newly rewritten part and the already written part so as to secure continuity of the data.

25. A computer graphics apparatus for presenting on a display a motion of an object defined by a plurality of articular segments manipulatable according to state values thereof, the computer graphics apparatus comprising:

an input device having a plurality of control units each of which is operable for time-sequentially inputting a control amount;

an assignment device that provides assignment information which defines correspondence between the control units of the input device and the articular segments of the object;

a function device that provides a functional parameter which defines a relation between the control amount of each control unit and the state value of each articular segment when the correspondence is defined between each control unit and each articular segment according to the assignment information, the function device further operating based on the functional parameter for converting the control amount time-sequentially inputted by each control unit into a time-series of the state value of each articular segment;

a graphic device that graphically manipulates each articular segment according to the time-series of the state value to present the motion of the object on the display, wherein the graphic device manipulates the plurality of the articular segments according to the time-series of the state values so as to present the motion of the object placed on a horizontal plane, the graphic device operating if the lowest one of the articular segments deviates from the horizontal plane during the motion of the object for adjusting the state value of the lowest articular segment such that the lowest articular segment can stay on the horizontal plane, the graphic device further operates if the lowest one of the articular segments staying on the horizontal plane drifts in a horizontal direction for adjusting the state value of the lowest articular segment such that the lowest articular segment can be fixed in the horizontal direction.

26. A method of controlling a motion of a computer graphics model having a skeleton structure constituted by a plurality of articular elements manipulatable according to state values thereof, the method comprising the steps of:

operating a plurality of control units that correspond to the articular elements of the skeleton structure so that each of the control units time-sequentially inputs a control amount for its corresponding articular element;

providing assignment information which determines correspondence between the control units and the articular elements of the computer graphics model;

providing a functional parameter which determines a relation between the control amount of each control unit and the state value of each articular element when the correspondence is determined between each control unit and each articular element according to the assignment information; and converting the control amount inputted by each control unit based on the functional parameter into a time-series of the state value of each articular element so that each articular element can be manipulated according to the time-series of the state value to effectuate the motion of the computer graphics model in real time, wherein the control amount time-sequentially inputted by each control unit is provided continuously and in real time, the time-series of the state value of each corresponding articular segment being converted from the control amount continuously and in parallel with the control amount.

27. The method according to claim 26, wherein the step of operating comprises operating a glove worn by a hand of an operator and having the plurality of control units disposed in contact with joints of fingers of the hand of the operator so that each control unit can detect an angular movement of each joint for inputting the control amount in terms of the detected angular movement.

28. A method of recording a motion of a computer graphics model having a skeleton structure constituted by a plurality of articular elements manipulatable according to time-series data, the method comprising the steps of:

defining in a memory a plurality of record tracks corresponding to the plurality of the articular elements, each record track being separate from other record track and being writeable with the time-series data of the corresponding articular element;

selecting at least one record track to allow writing of the time-series data for the corresponding articular element into the selected record track while inhibiting writing of the time-series data into the remaining record tracks; and providing the time-series data in sequence so that the provided time-series data can be exclusively written into the selected record track in sequence without disturbing the remaining record tracks, wherein at least two time-series data are written in sequence to the selected record track.

29. A method of recording a motion of a computer graphics model having a skeleton structure constituted by a plurality of articular elements manipulatable according to time-series data, the method comprising the steps of:

defining in a memory a plurality of record tracks corresponding to the plurality of the articular elements, each record track being separate from other record track and being writeable with the time-series data of the corresponding articular element;

selecting at least one record track to allow writing of the time-series data into the selected record track while inhibiting writing of the time-series data into the remaining record tracks;

providing the time-series data so that the provided time-series data can be exclusively written into the selected record track without disturbing the remaining record tracks; and reading the time-series data concurrently from the plurality of the record tracks so as to manipulate the plurality of the articular elements to thereby visually reproduce the motion of the computer graphics model while allowing the edit means to write the time-series data into the selected record track.

30. The method according to claim 29, further comprising the step of rewriting the time-series data of the selected record data while monitoring the motion of the computer graphics model to thereby enable real time correction in the manipulation of the articular element corresponding to the selected record track.

31. A method of controlling a motion of a computer graphics model having a skeleton structure constituted by a plurality of segments which are manipulatable according to time-series data, the method comprising the steps of:

inputting the time-series data in correspondence with each of the segments;

manipulating the plurality of the segments according to the inputted time-series data so as to visually reproduce the motion of the computer graphics model on a horizontal plane; and adjusting the time-series data of the lowest one of the segments when the lowest segment deviates from the horizontal plane so that the lowest segment is made to stay on the horizontal plane during the motion of the computer graphics model, wherein such deviation is caused by a movement in at least one of the segments above the lowest one of the segments.

32. A method of controlling a motion of a computer graphics model having a skeleton structure constituted by a plurality of segments which are manipulatable according to time-series data, the method comprising the steps of:

inputting the time-series data in correspondence with each of the segments;

manipulating the plurality of the segments according to the inputted time-series data so as to visually reproduce the motion of the computer graphics model on a horizontal plane;

adjusting the time-series data of the lowest one of the segments if the lowest segment deviates from the horizontal plane during the motion of the computer graphics model; and adjusting the time-series data of the lowest segment if the lowest segment staying on the horizontal plane drifts in a horizontal direction so that the lowest segment can be fixed in the horizontal direction during the motion of the computer graphics model.

33. A machine readable medium for use in a computer graphics apparatus having a CPU for controlling a motion of a computer graphic model having a skeleton structure constituted by a plurality of articular elements manipulatable according to state values thereof, the medium containing program instructions executable by the CPU for causing the computer graphics apparatus to perform the method comprising the steps of:

operating a plurality of control units that correspond to the articular elements of the skeleton structure so that each of the control units time-sequentially inputs a control amount for its corresponding articular element;

providing assignment information which determines correspondence between the control units and the articular elements of the computer graphics model;

providing a functional parameter which determines a relation between the control amount of each control unit and the state value of each articular element when the correspondence is determined between each control unit and each articular element according to the assignment information; and converting the control amount inputted by each control unit based on the functional parameter into a time-series of the state value of each articular element so that each articular element can be manipulated according to the time-series of the state value to effectuate the motion of the computer graphics model in real time, wherein the control amount time-sequentially inputted by each control unit is provided continuously and in real time, the time-series of the state value of each corresponding articular segment being converted from the control amount continuously and in parallel with the control amount.

34. The machine readable medium according to claim 33, wherein the step of operating comprises operating a glove worn by a hand of an operator and having the plurality of control units disposed in contact with joints of fingers of the hand of the operator so that each control unit can detect an angular movement of each joint for inputting the control amount in terms of the detected angular movement.

35. A machine readable medium for use in a computer graphics apparatus having a CPU for recording a motion of a computer graphic model having a skeleton structure constituted by a plurality of articular elements manipulatable according to time-series data, the medium containing program instructions executable by the CPU for causing the computer graphics apparatus to perform the method comprising the steps of:

defining in a memory a plurality of record tracks corresponding to the plurality of the articular elements, each record track being separate from other record track and being writeable with the time-series data of the corresponding articular element;

selecting at least one record track to allow writing of the time-series data for the corresponding articular element into the selected record track while inhibiting writing of the time-series data into the remaining record tracks; and providing the time-series data in sequence so that the provided time-series data can be exclusively written into the selected record track in sequence without disturbing the remaining record tracks, wherein at least two time-series data are written in sequence to the selected record track.

36. A machine readable medium for use in a computer graphics apparatus having a CPU for recording a motion of a computer graphic model having a skeleton structure constituted by a plurality of articular elements manipulatable according to time-series data, the medium containing program instructions executable by the CPU for causing the computer graphics apparatus to perform the method comprising the steps of:

defining in a memory a plurality of record tracks corresponding to the plurality of the articular elements, each record track being separate from other record track and being writeable with the time-series data of the corresponding articular element;

selecting at least one record track to allow writing of the time-series data into the selected record track while inhibiting writing of the time-series data into the remaining record tracks;

providing the time-series data so that the provided time-series data can be exclusively written into the selected record track without disturbing the remaining record tracks; and reading the time-series data concurrently from the plurality of the record tracks so as to manipulate the plurality of the articular elements to thereby visually reproduce the motion of the computer graphics model while allowing the edit means to write the time-series data into the selected record track.

37. The machine readable medium according to claim 36, wherein the method further comprises the step of rewriting the time-series data of the selected record data while monitoring the motion of the computer graphics model to thereby enable real time correction in the manipulation of the articular element corresponding to the selected record track.

38. A machine readable medium for use in a computer graphics apparatus having a CPU for controlling a motion of a computer graphic model having a skeleton structure constituted by a plurality of segments which are manipulatable according to time-series data, the medium containing program instructions executable by the CPU for causing the computer graphics apparatus to perform the method comprising the steps of:

inputting the time-series data in correspondence with each of the segments;

manipulating the plurality of the segments according to the inputted time-series data so as to visually reproduce the motion of the computer graphics model on a horizontal plane; and adjusting the time-series data of the lowest one of the segments when the lowest segment deviates from the horizontal plane so that the lowest segment is made to stay on the horizontal plane during the motion of the computer graphics model, wherein such deviation is caused by a movement in at least one of the segments above the lowest one of the segments.

39. The machine readable medium according to claim 38, wherein the method further comprises the step of adjusting the time-series data of the lowest segment if the lowest segment staying on the horizontal plane drifts in a horizontal direction so that the lowest segment can be fixed in the horizontal direction during the motion of the computer graphics model.

* * * * *